3,064,026
FERROCENYL ARYL ETHERS
Marvin D. Rausch, Dayton, Ohio, assignor to Monsanto Chemical Company, St. Louis, Mo., a corporation of Delaware
No Drawing. Filed July 5, 1960, Ser. No. 40,529
17 Claims. (Cl. 260—439)

This invention relates to dicyclopentadienyliron compounds. More particularly, this invention is directed to new ferrocenyl aryl ethers, and to a method for preparing them.

It is an object of this invention to provide new and useful ferrocenyl ethers. It is a further object of this invention to provide ferrocenyl aryl ethers. It is yet another object of this invention to provide a method for preparing ferrocenyl aryl ethers.

According to this invention, new ferrocenyl aryl ether type compounds are prepared by reacting a haloferrocene with a salt of a phenolic type compound having a general formula selected from the group consisting of

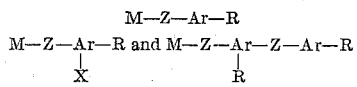

wherein M is a salt-forming cation, preferably an alkali metal cation such as sodium or potassium, Z is a chalcogen element having an atomic weight of from 16 to 33 (oxygen or sulfur), Ar is an aromatic hydrocarbyl radical having from 6 to 18 carbon atoms, X is a halogen, and R is a radical containing hydrogen, less than 20 carbon atoms, and less than three chalcogen elements of the above-defined types, in the presence of copper at temperatures on the order of about 60° C. to 180° C. at atmospheric pressure. In the preferred embodiment, the haloferrocene, i.e., a monochloro-, monobromo-, or monoiodo-ferrocene, is reacted with a substantially equimolar amount of an aromatic phenolic salt in the presence of activated copper, i.e., copper which has been specially treated to render it more reactive, at a temperature of from about 150° C. to 160° C. until a substantial quantity of the ferrocenyl aryl ether has been prepared. The reaction may be conducted in the presence or absence of air or oxygen. The ferrocenyl aryl ether product can readily be recovered from the reaction mixture by known methods, for example, solvent extraction, and purified in a similar manner.

The haloferrocenes useful for the purposes of this invention are monohaloferrocenes, i.e., ferrocenes having one bromine, chlorine, or iodine atom attached to one of the cyclopentadienyl rings, and are obtained readily, for example, by the method described by A. N. Nesemeyanov et al., Doklady Akad. S.S.S.R., vol. 100, pages 1099–1101 (1955). Iodoferrocene was thus prepared by the gradual addition of iodine solution to a hot xylene solution of ferrocenyl mercuric chloride, a light gray-green precipitate being formed. On the addition of a larger excess of iodine the replacement of the mercury in the complex by iodine took place and the light gray-green precipitate was converted into a black precipitate. After cooling the solution, the precipitate was washed with alcohol, carefully ground, and mixed for 1½ hours with an aqueous solution of sodium thiosulfate. This operation was repeated twice, after which the precipitate was washed several times with ether. The ether extracts were combined and the ether was evaporated. The yield of iodoferrocene which was obtained in this way was 64% of the theoretical. Bromoferrocene is prepared in the same manner and bromo- and chloroferrocene can be prepared from ferrocenylboronic acid, for example, as described in Doklady Akad. Nauk S.S.S.R., vol. 12, page 1004 (1959).

The copper used for the purpose of this invention can be the ordinary metallic copper, sometimes referred to as copper bronze, and may be in any desired physical form. In this invention, powdered copper is preferred since it is desired, in such a case, to have as intimate contact between the reactants as possible. This may be done, e.g., by mixing the haloferrocene with the copper prior to the heating step. Since copper metal usually acquires surface coatings of copper oxides thereon, it is ordinarily preferred for the purpose of this invention to treat the copper to render it more reactive. Various treatments for this purpose are known. The following procedure was used to activate the copper for the purpose of the specific examples given below:

To 100 g. of copper powder there is added 1 liter of a 2% solution of iodine in acetone over a period of from 5–10 minutes. This results in the formation of a rather grayish color due to the formation of copper iodide. The product is filtered on a Buchner funnel, removed, and washed by stirring with 500 ml. of 1:1 solution of concentrated hydrochloric acid in acetone. The copper iodide dissolves and the residual copper powder is filtered and washed with acetone. It is then dried in a vacuum desiccator. The thus obtained activated copper should be used immediately after preparation.

As above stated, the ferrocenyl aryl ether compounds of this invention may be prepared by reacting a haloferrocene, as above defined, with an alkali metal salt of a phenolic type compound. Any alkali metal salt may be used, but the sodium and potassium salts are preferred. The haloferrocene may be reacted with the alkali metal salt of a phenolic compound of the types illustrated herein. The term "phenolic-type" compound as used herein refers to aromatic compounds containing one or more carbon rings therein having a hydroxyl group, that is, an —OH group attached thereto. The salt of such a compound has the hydrogen atom of the hydroxyl group replaced by the salt cation, e.g., a sodium or potassium ion.

Examples of phenolic type compounds that may be used in this invention are the alkali metal salts of phenol, o-, m-, and p-cresol, 1-, and 2-naphthol, 2-, and 5-chrysenol, 9-anthanol, 1-, 2-, 3-, 4-, and 9-phenanthrol, and o-, m-, and p-xenol (o-, m-, and p-phenylphenol), etc.

Examples of related substituted phenolic compounds that may be used are the alkali metal salts of thymol, trimethoxyphenylphenol, phenylthiophenol, o-propylphenol, p-allylphenol, 2-allyl-4-(2-butenyl)phenol, m-benzylphenol, 4-chlorophenol, o-benzyloxyphenol, 4-bromo-3-chlorophenol, 2,4-diethylphenol, 4-cyclohexylphenol, 3,5-diisopropylphenol, 3-pentadecylphenol, pentamethylphenol, 4,8-dimethoxy-1-naphthol, 2,4-dihexyl-2-naphthol, 4-octadecyl-1-naphthol, 1-allyl-3-methoxy-2-naphthol, 1-bromo-3-hexyloxy-3-phenanthrol, 2,3 - dipropoxy-10-methyl-9-phenanthrol, 3-hexyl-4-chrysenol, etc.

The alkali metal salts of aromatic thiols may also be used to prepare compounds within the scope of this invention, a few examples of said thiols being: benzenethiol, 1-naphthalenethiol, 1-methyl-2-naphthalenethiol, 8-methoxy-1-chrysenethiol, 10-ethoxy-9-anthracenethiol, 1-phenanthracenethiol, 4-tert-dodecylbenzenethiol, 3-phenylthiobenzenethiol, etc.

The haloferrocene and phenolic compound salt may be combined in any desired proportions to effect the reaction. Usually, however, stoichiometric proportions of the two reactants are sufficient to affect rapid, economical conversion to the ferrocenyl aryl ether compounds of this invention. It is usually desired, however, to have present at least stoichimetric quantities of the phenolic salt reactant, preferably a slight excess thereof, in relation to the haloferrocene reactant to insure efficient production of the ferrocenyl aryl ether. The compounds may also be prepared by adding sufficient alkali metal basic material, for example, potassium hydroxide, sodium bicarbonate, etc., to the phenol compound just prior to, or simultaneously with, the haloferrocene reactant. Usually a slight excess of the basic material is added to insure complete reaction between the haloferrocene and the phenolic compound used to make the ether products of this invention.

The copper catalyst may be combined with the phenolic compound and the haloferrocene in any desired order. It may be added to the phenol compound prior to, simultaneously with, or after the addition of the haloferrocene. Likewise, it may be combined with the haloferrocene prior to the addition of the phenol compound and the base or the phenol salt. When the haloferrocene has already been heated to within the reaction temperature, stated above, it is desirable to combine it first with the phenol compound salt then with the copper to avoid undesired side reactions of the haloferrocene. It is only necessary that the reactant be contacted within a temperature range of from 60° to 180° C. for a time sufficient to affect the formation of the ferrocenyl aryl ether. Indications are that within this temperature range, under optimum conditions, very short reaction times are needed. When operating within the preferred method of this invention, that is, when the intimate mixture of the reactants are heated to 150° C. to 160° C., reaction is completed within a few minutes. Longer heating times are usually used to insure complete reaction and efficient use of reactants. However, longer reaction times on the order of ½ to 20 hours are not unusual under varying conditions of reaction. Factors such as amount of copper used, degree of activation of the copper, the physical form of the copper used, absence or presence of diluent material, the particular phenolic compound being used, etc., will have some influence on the reaction time.

Heating of the haloferrocene with the salt of the desired phenol compound in the presence of copper results in a chemical reaction to obtain the ferrocenyl aryl ether compounds of this invention with the release of an atom of halogen. This reaction does not proceed to any appreciable extent in the absence of copper. The ferrocenyl aryl ether product is perhaps best removed from the reaction mixture by solvent extraction or sublimation. These ferrocenyl aryl ethers are soluble in such organic liquids as hexane, heptane, benzene, xylene, etc., and are readily taken up therein leaving the copper and metal halide by-products as residue. The ferrocenyl aryl ether may then by crystallized from the organic solvent used, and redissolved and recrystallized if further purification is desired. The copper-metal halide residue can be treated as indicated above to remove the halide ion and be used again in the process if desired.

Examples of new compounds within the scope of this invention are: phenoxyferrocene, 1-naphthoxyferrocene, 9 - phenanthranoxyferrocene, (m - phenylphenoxy)ferrocene, (o - phenoxy)phenoxyferrocene, 2 - isopropyl - 4-methylphenoxyferrocene, 3 - (2,4,6 - trimethoxyphenyl) phenoxyferrocene, (1-chrysenoxy)ferrocene, 2-, 3-, and 4 - methylphenoxyferrocene, and o - benzylphenoxyferrocene. Further examples of ferrocenyl aryl ether compounds obtained by reacting the haloferrocene with a salt of a phenolic type compound are o-propenylphenoxyferrocene, m-butylphenoxyferrocene, 2 - allyl - 4-(2-butenyl)-phenoxyferrocene, 4-allyl-2 - methoxyphenoxyferrocene, o - bromophenoxyferrocene, 2 - bromo - tert-butylphenoxyferrocene, 4-bromo-3 - chlorophenoxyferrocene, o-iodophenoxyferrocene, 4-cyclo-hexylphenoxyferrocene, 4-dodecylphenoxyferrocene, 2,4-diethylphenoxyferrocene, pentadecylphenoxyferrocene, m - [m-phenoxy-phenoxy]-phenoxyferrocene, 4,8-dimethoxynaphthoxyferrocene, 6-ethoxy-2,5-dimethyl-1-naphthoxyferrocene, 4 - octadecyl-1-naphthoxyferrocene, 1-allyl-3-methoxy - 2 - naphthoxyferrocene, 1-bromo-2-naphthoxyferrocene, 2,3-dimethoxy- 10 - methyl - 9 - phenanthracenoxyferrocene, 1 - chloro-9-phenanthracenoxyferrocene, 4 - octyl - 2-chrysenoxyferrocene, etc.

Thioether compounds of ferrocene are prepared in the same manner as the oxygen ether compounds by using a salt of a thiophenolic compound. A few examples are: phenylthioferrocene, 4-nonylphenylthioferrocene, p-phenylphenylthioferrocene, o-phenoxyphenylthioferrocene, 2-naphthylthioferrocene, 3-methyl-9-chrysenylthioferrocene, 2-isopropyl - 4 - methylphenylthioferrocene, 4-(2,4,6-trimethoxyphenyl)phenylferrocene, 4 - (2-butenyl)-1-naphthylthioferrocene, 10-methyl-9-phenanthrylthioferrocene, and 2-methylphenylthioferrocene.

The ferrocenyl aryl ethers of this invention obtained according to the method of this invention are generally yellow to orange colored crystalline materials having readily determinable melting points. These compounds are particularly stable to heat in the liquid state, even in the presence of oxygen up to 225° C. to 250° C. When heated in the absence of oxygen, they are not visibly altered at temperatures up to 350° C. They are useful as antioxidants, and as gasoline anti-knock agents. They are also useful as pigments for paint compositions.

The invention is more particularly illustrated by the following examples but is not intended to be limited thereby.

*Example 1*

A constricted glass tube was flushed with nitrogen, and then there was added 0.96 g. (0.01 mole) of phenol and 0.28 g. (0.005 mole) of potassium hydroxide. The mixture was heated at 155° C. until the potassium hydroxide had all dissolved. After cooling, 0.94 g. (0.003 mole) of iodoferrocene and 0.02 g. of copper bronze (activated by the method of Vogel, Textbook of Practical Organic Chemistry, page 188, Longmans, Greene and Co., London (1954)) was added, the tube sealed under nitrogen, and heated in a bath of silicone oil at 155° C. to 160° C. for a period of 8 hours. After cooling, the tube was cautiously opened and the contents were extracted several times with boiling benzene. The benzene extracts were washed with water, 10% sodium hydroxide solution, again with water, and dried over anhydrous magnesium sulfate. The benzene was evaporated under reduced pressure, and the residue taken up in a small amount of 1:1 hexane-benzene mixture and chromatographed on a column of alumina. Elution with hexane removed a light yellow foreband which after extraction with methanol was found to be 0.12 g. of ferrocene, M.P. 171–3° C. Further elution removed a darker yellow band which was recrystallized from hexane, producing 0.202 g. of ferrocenyl phenyl ether, M.P. 93–93.5° C.

*Example 2*

In a manner similar to that described in Example 1 above, there was combined 8.46 g. (0.03 mole) of 3-(3-phenoxyphenoxy)phenol, 0.93 g. (0.016 mole) of potassium hydroxide, 3.12 g. (0.01 mole) of iodoferrocene, and 0.06 g. of copper bronze. This mixture was heated at a temperature of 155–160° C. for a period of 8 hours and extracted with hexane-benzene mixture to obtain 2.30 g. of 3-(3-phenoxyphenoxy)phenoxyferrocene, M.P. 73–4° C. Recrystallization of the ether from hexane raised the melting point to 74.5–75° C.

*Example 3*

A Schlenk tube was flushed with nitrogen, and 1.44 g. (0.01 mole) of 2-naphthol, and 0.28 g. (0.005 mole) of potassium hydroxide were added and heated at 150° C. until the mixture was homogenized. After cooling, 0.036 g. (0.003 mole) of iodoferrocene and 0.02 g. of copper bronze were added, and a 2-ft. air condenser was inserted into the top of the tube. The reaction mixture was heated at 155° C. for 16 hours. After cooling, the contents were washed with 100 ml. of a 10% potassium hydroxide solution, then with water, and finally extracted with boiling benzene until the extracts were colorless. The benzene was evaporated under reduced pressure and the residue was chromatographed on alumina. An orange band was eluded from a dark brown, decomposition area. The orange band was rechromatographed on a short alumina column using a 1:1 hexane-benzene mixture. From the first yellow band which was obtained, was collected 0.11 g. of ferrocene, M.P. 173–174° C. From the second band there was collected 0.15 g. of yellow crystals, M.P. 139–141° C. This material was recrystallized from hexane, producing 0.12 g. of 2-naphthyloxy-ferrocene M.P. 143–143.5° C.

*Example 4*

From a reaction of 1.70 g. (0.01 mole) of 2-phenylphenol, 0.14 g. (0.0025 mole) of potassium hydroxide, 0.468 g. (0.0015 mole) of iododferrocene, and 0.02 g. of copper bronze in a manner similar to that described in Example 3, there was isolated 0.04 g. of ferrocene and 0.33 g. of 2-phenylphenoxyferrocene, M.P. 138–139° C. Recrystallization from hexane raised the melting point of the ether to 141.5–142° C.

*Example 5*

From a reaction of 1.73 g. (0.01 mole) of 4-bromophenol, 0.28 g. (0.005 mole) of potassium hydroxide, 0.936 g. (0.003 mole) of iodoferrocene, and 0.02 g. of copper bronze in a manner similar to that described in Example 3, there was isolated 0.18 g. of ferrocene and the crude ether. The latter was crystallized from hexane to produce 0.21 g. of 4-bromophenoxyferrocene, M.P. 86–87° C. Recrystallization of the ether raised the melting point to 87–87.5° C.

*Example 6*

In a Schlenk tube that had been previously flushed with nitrogen, there was added 3 ml. of absolute methanol and 0.007 g. (0.003 mole) of sodium metal. After the sodium had reacted, 0.34 ml. (0.0032 mole) of thiophenol was added, and the clear solution was heated on a steam bath for 20 minutes. The excess solvent was then evaporated off, 0.936 g. (0.003 mole) of iodoferrocene and 0.02 g. of copper was added, and the reaction mixture was heated at 158° C. for 2.5 hours. After cooling, the contents were extracted with boiling ethanol, filtered, and the extracts were solidified with a little dilute sulfuric acid. This extract together with a little zinc dust was steam distilled for about 30 minutes. The orange residue remaining in the flask was extracted with ether, dried over Drierite (anhydrous magnesium sulfate) and the ether distilled. The residue amounted to 0.67 g. (76% yield) of the phenylthioferrocene, M.P. 109–110° C. Recrystallization of the product from hexane raised the melting point to 111.5 to 112° C.

I claim:

1. compounds selected from the group consisting of

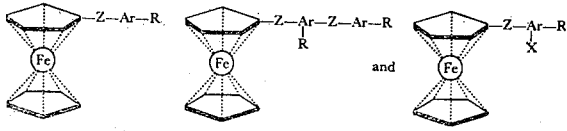

wherein Z is a chalcogen element having an atomic weight of from 16 to 33, Ar is an aromatic hydrocarbyl radical having from 6 to 18 carbon atoms which aromatic hydrocarbyl radical is bonded to the chalcogen element through an aromatic ring carbon atom thereof; X is a halogen, selected from the group consisting of bromine, chlorine, and iodine; and R is selected from the group consisting of hydrogen, and hydrocarbyl, and hydrocarbyloxy radicals having less than 20 carbon atoms.

2. Compounds having a formula

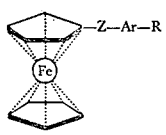

wherein Z is a chalcogen element having an atomic weight of from 16 to 33, Ar is an aromatic hydrocarbyl radical having atoms which aromatic hydrocarbyl radical is bonded to the chalcogen element through an aromatic ring carbon atom thereof; and R is selected from the group consisting of hydrogen, and hydrocarbyl, and hydrocarbyloxy radicals having less than 20 carbon atoms.

3. Compounds having the formula

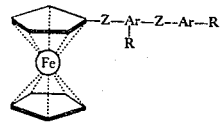

wherein Z is a chalcogen element having an atomic weight of from 16 to 33, Ar is an aromatic hydrocarbyl radical having 6 to 18 carbon atoms which aromatic hydrocarbyl radical is bonded to the chalcogen element through an aromatic ring carbon atom thereof; and R is selected from the group consisting of hydrogen, and hydrocarbyl, and hydrocarbyloxy radicals having less than 20 carbon atoms.

4. Compounds of the formula

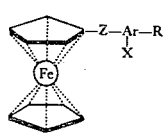

wherein Z is a chalcogen element having an atomic weight of from 16 to 33, Ar is an aromatic hydrocarbyl radical having from 6 to 18 carbon atoms which aromatic hydrocarbyl radical is bonded to the chalcogen element through an aromatic ring carbon atom thereof; X is a halogen selected from the group consisting of bromine, chlorine, and iodine; and R is selected from the group consisting of hydrogen, and hydrocarbyl, and hydrocarbyloxy radicals having less than 20 carbon atoms.

5. Phenoxyferrocene.
6. 2-naphthyloxyferrocene.
7. 2-phenylphenoxyferrocene.
8. 3-[3-phenoxyphenoxy] phenoxyferrocene.
9. 4-bromophenoxyferrocene.
10. Phenylthioferrocene.

11. The process which comprises reacting a monohaloferrocene selected from the group consisting of iodoferrocene, bromoferrocene, and chloroferrocene with an alkali metal salt of a phenolic type compound having a formula selected from the group consisting of $$M-Z-Ar-R$$

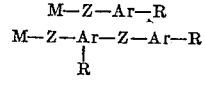

and

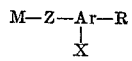

wherein M is an alkali metal cation, Z is a chalcogen element having an atomic weight of between 16 and 33, Ar is an aromatic hydrocarbyl radical of from 6 to 18 carbon atoms which aromatic hydrocarbyl radical is bonded to the chalcogen element through an aromatic ring carbon atom thereof; X is a halogen selected from the group consisting of bromine, chlorine, and iodine; and R is selected from the group consisting of hydrogen and hydrocarbyl and hydrocarbyloxy radicals having less than 20 carbon atoms, in the presence of copper, at a temperature of from 60° C. to 180° C., and recovering from the resulting reaction mixture a compound having a formula selected from the group consisting of

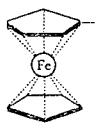 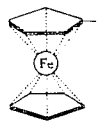 and 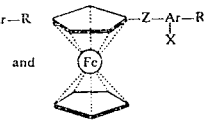

wherein Z, Ar, R, and X are as defined above.

12. The process which comprises reacting a monohaloferrocene selected from the group consisting of iodoferrocene, bromoferrocene and chloroferrocene with an alkali metal salt of a phenolic type compound having the formula

wherein M is an alkali metal cation, Z is a chalcogen element having an atomic weight of between 16 and 33, Ar is an aromatic hydrocarbyl radical of from 6 to 18 carbon atoms which aromatic hydrocarbyl radical is bonded to the chalcogen element through an aromatic ring carbon atom thereof; and R is selected from the group consisting of hydrogen and hydrocarbyl and hydrocarbyloxy radicals having less than 20 carbon atoms, in the presence of copper at a temperature of from 60° C. to 180° C. and recovering from the resulting reaction mixture a compound having the formula

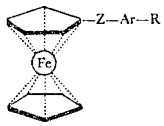

wherein Z, Ar, and R are as defined above.

13. The process which comprises reacting a monohaloferrocene selected from the group consisting of iodoferrocene, bromoferrocene, and chloroferrocene, with an alkali metal salt of a phenolic type compound having the formula M—Z—Ar—Z—Ar—R
       |
       R wherein M is an alkali metal cation, Z is a chalcogen element having an atomic weight of between 16 and 33, Ar is an aromatic hydrocarbyl radical of which aromatic hydrocarbyl radical is bonded to the chalcogen element through an aromatic ring carbon atom thereof; and R is selected from the group consisting of hydrogen and hydrocarbyl and hydrocarbyloxy radicals having less than 20 carbon atoms, in the presence of copper, at a temperature of from 60° C. to 180° C., and recovering from the resulting reaction mixture a compound having the formula

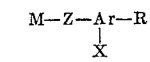

wherein Z, Ar, and R are as defined above.

14. Process which comprises reacting a monohaloferrocene, selected from the group consisting of iodoferrocene, bromoferrocene, and chloroferrocene with an alkali metal salt of a phenolic type compound having the formula M—Z—Ar—R
       |
       X wherein M is an alkali metal cation, Z is a chalcogen element having an atomic weight of between 16 and 33, Ar is an aromatic hydrocarbyl radical of from 6 to 18 carbon atoms which aromatic hydrocarbyl radical is bonded to the chalcogen element through an aromatic ring carbon thereof; X is a halogen selected from the group consisting of bromine, chlorine and iodine, and R is selected from the group consisting of hydrogen and hydrocarbyl and hydrocarbyloxy radicals having less than 20 carbon atoms, in the presence of copper, at a temperature of from 60° C. to 180° C. and recovering from the resulting reaction mixture a compound having the formula

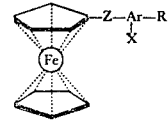

wherein Z, Ar, R and X are as defined above.

15. Process which comprises reacting a monohaloferrocene selected from the group consisting of iodoferrocene, bromoferrocene and chloroferrocene with potassium phenate in the presence of copper, and recovering from the resulting reaction mixture phenoxyferrocene.

16. Process which comprises reacting a monohaloferrocene selected from the group consisting of iodoferrocene, bromoferrocene, and chloroferrocene with the potassium salt of 3-[3-phenoxyphenoxy]phenate in the presence of copper, and recovering 3-[3-phenoxyphenoxy]phenoxyferrocene.

17. The process which comprises reacting a monohaloferrocene selected from the group consisting of iodoferrocene, bromoferrocene, and chloroferrocene with sodium thiophenate in the presence of copper, and recovering from the resulting reaction mixture phenylthioferrocene.

No references cited.

UNITED STATES PATENT OFFICE
CERTIFICATE OF CORRECTION

Patent No. 3,064,026                                    November 13, 1962

Marvin D. Rausch

It is hereby certified that error appears in the above numbered patent requiring correction and that the said Letters Patent should read as corrected below.

Column 2, line 54, for "3-phenanthrol" read -- 9-phenanthrol --; line 69, for "stoichimetric" read -- stoichiometric --; column 3, line 50, for "by" read -- be --; column 4, line 70, for "0.036" read -- 0.936 --; column 5, lines 18 and 28, for "iododferrocene", each occurrence, read -- iodoferrocene --; column 6, line 10, after "having" insert -- from 6 to 18 carbon --; column 7, line 45, after "of" insert -- from 6 to 18 carbon atoms --.

Signed and sealed this 21st day of May 1963.

SEAL)
.ttest:

:RNEST W. SWIDER                              DAVID L. LADD
.ttesting Officer                                    Commissioner of Patents